(12) United States Patent
Otani

(10) Patent No.: US 8,370,302 B2
(45) Date of Patent: Feb. 5, 2013

(54) METHOD AND APPARATUS FOR BLOCK BASED VOLUME BACKUP

(75) Inventor: Toshio Otani, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 314 days.

(21) Appl. No.: 12/476,435

(22) Filed: Jun. 2, 2009

(65) Prior Publication Data

US 2010/0306174 A1 Dec. 2, 2010

(51) Int. Cl.
*G06F 7/00* (2006.01)
*G06F 17/00* (2006.01)

(52) U.S. Cl. .................................................. 707/640

(58) Field of Classification Search .................. None
See application file for complete search history.

(56) References Cited

U.S. PATENT DOCUMENTS

| | | | | |
|---|---|---|---|---|
| 5,978,791 | A * | 11/1999 | Farber et al. | 707/640 |
| 6,625,623 | B1 * | 9/2003 | Midgley et al. | 707/640 |
| 6,978,282 | B1 * | 12/2005 | Dings et al. | 707/610 |
| 7,243,116 | B2 * | 7/2007 | Suzuki et al. | 707/640 |
| 7,356,658 | B2 * | 4/2008 | Satoyama et al. | 711/162 |
| 7,398,285 | B2 * | 7/2008 | Kisley | 1/1 |
| 7,467,163 | B1 * | 12/2008 | Dodds et al. | 1/1 |
| 7,565,661 | B2 * | 7/2009 | Sim-Tang | 719/318 |
| 7,617,217 | B1 * | 11/2009 | Chen et al. | 1/1 |
| 7,743,033 | B2 * | 6/2010 | Patel et al. | 707/652 |
| 7,984,016 | B2 * | 7/2011 | Kisley | 707/613 |
| 7,996,636 | B1 * | 8/2011 | Prakash et al. | 711/162 |
| 2003/0131207 | A1 * | 7/2003 | Arakawa et al. | 711/162 |
| 2003/0172158 | A1 * | 9/2003 | Pillai et al. | 709/225 |
| 2004/0139125 | A1 * | 7/2004 | Strassburg et al. | 707/202 |
| 2004/0141498 | A1 * | 7/2004 | Rangan et al. | 370/380 |
| 2005/0033745 | A1 * | 2/2005 | Wiener et al. | 707/10 |
| 2005/0204105 | A1 * | 9/2005 | Kawamura et al. | 711/162 |
| 2005/0216535 | A1 * | 9/2005 | Saika et al. | 707/204 |
| 2006/0013222 | A1 * | 1/2006 | Rangan et al. | 370/389 |
| 2006/0112245 | A1 * | 5/2006 | Ikegaya et al. | 711/163 |
| 2006/0184587 | A1 * | 8/2006 | Federwisch et al. | 707/200 |
| 2007/0185940 | A1 * | 8/2007 | Prahlad et al. | 707/204 |
| 2007/0192375 | A1 * | 8/2007 | Nakatani et al. | 707/200 |
| 2008/0010368 | A1 * | 1/2008 | Hubbard et al. | 709/223 |
| 2008/0028009 | A1 * | 1/2008 | Ngo | 707/204 |
| 2009/0024752 | A1 | 1/2009 | Shitomi | |
| 2009/0055607 | A1 * | 2/2009 | Schack et al. | 711/162 |
| 2010/0241613 | A1 * | 9/2010 | Rao | 707/640 |

OTHER PUBLICATIONS

Vrable et al., "Cumulus: Filesystem Backup to the Cloud", 7th USENIX Conference on File and Storage Technologies, Feb. 2009, pp. 225-238, USENIX Association, USA.

* cited by examiner

*Primary Examiner* — Wilson Lee
*Assistant Examiner* — Jessica N Le
(74) *Attorney, Agent, or Firm* — Mattingly & Malur, P.C.

(57) ABSTRACT

Embodiments of the invention provide methods and apparatuses for block based storage subsystem to have backup ability to a file based storage service such as HTTP (Hypertext Transfer Protocol) or cloud storage service. In one embodiment, a storage system is coupled via a network to a storage service which has one or more file servers. The storage system includes a volume-based snapshot control module configured to create a snapshot volume of data at a certain time, the snapshot volume being a block-based volume which is divided into a plurality of portions. A copy control module is configured to read each portion of the snapshot volume and send said each portion as file data to the storage service via the network, and to generate mapping information between an address of said each portion in the storage system and a file identifier of the file data of said each portion in the storage service.

15 Claims, 26 Drawing Sheets

Flowchart of creating replicated snapshot

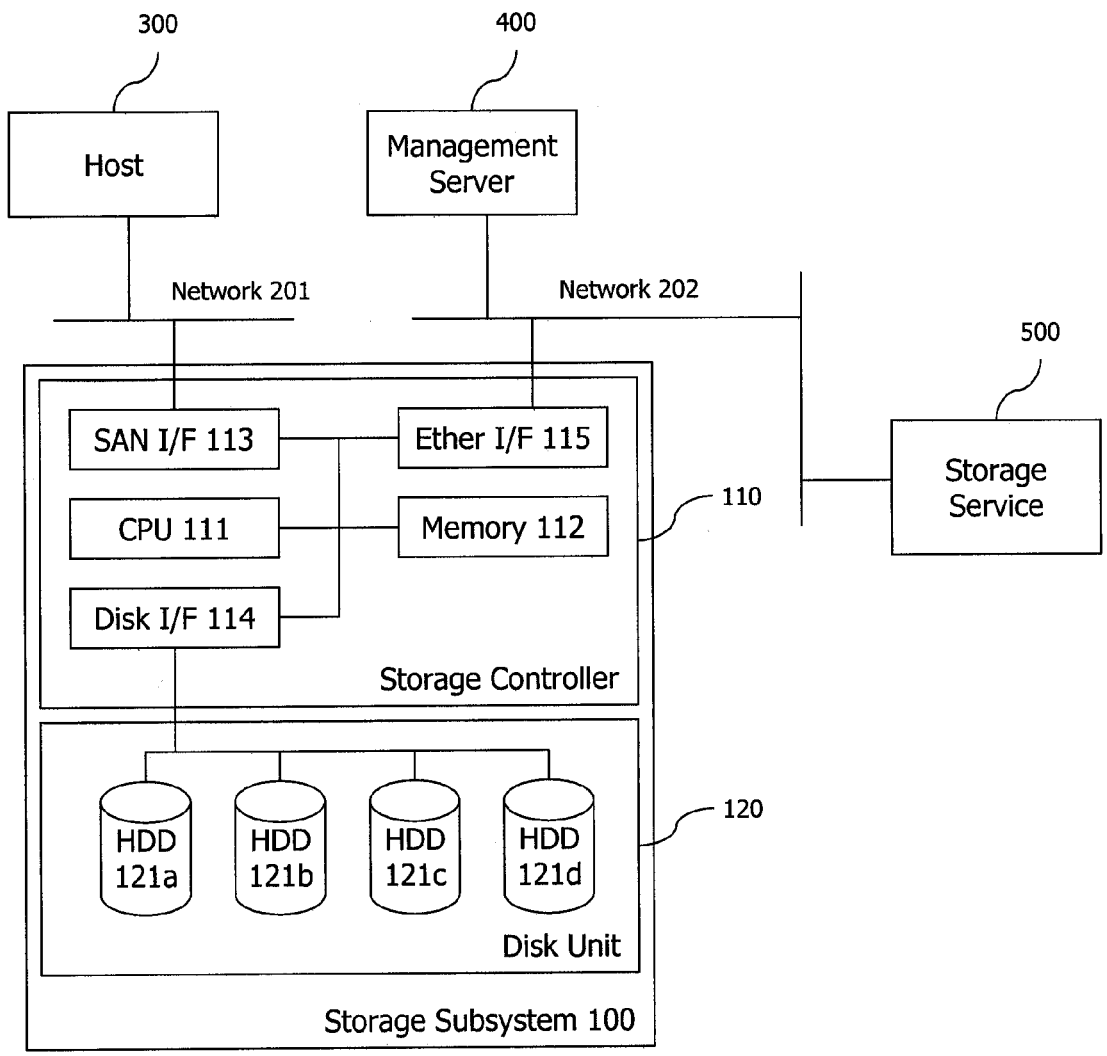
Fig.1 System Configuration

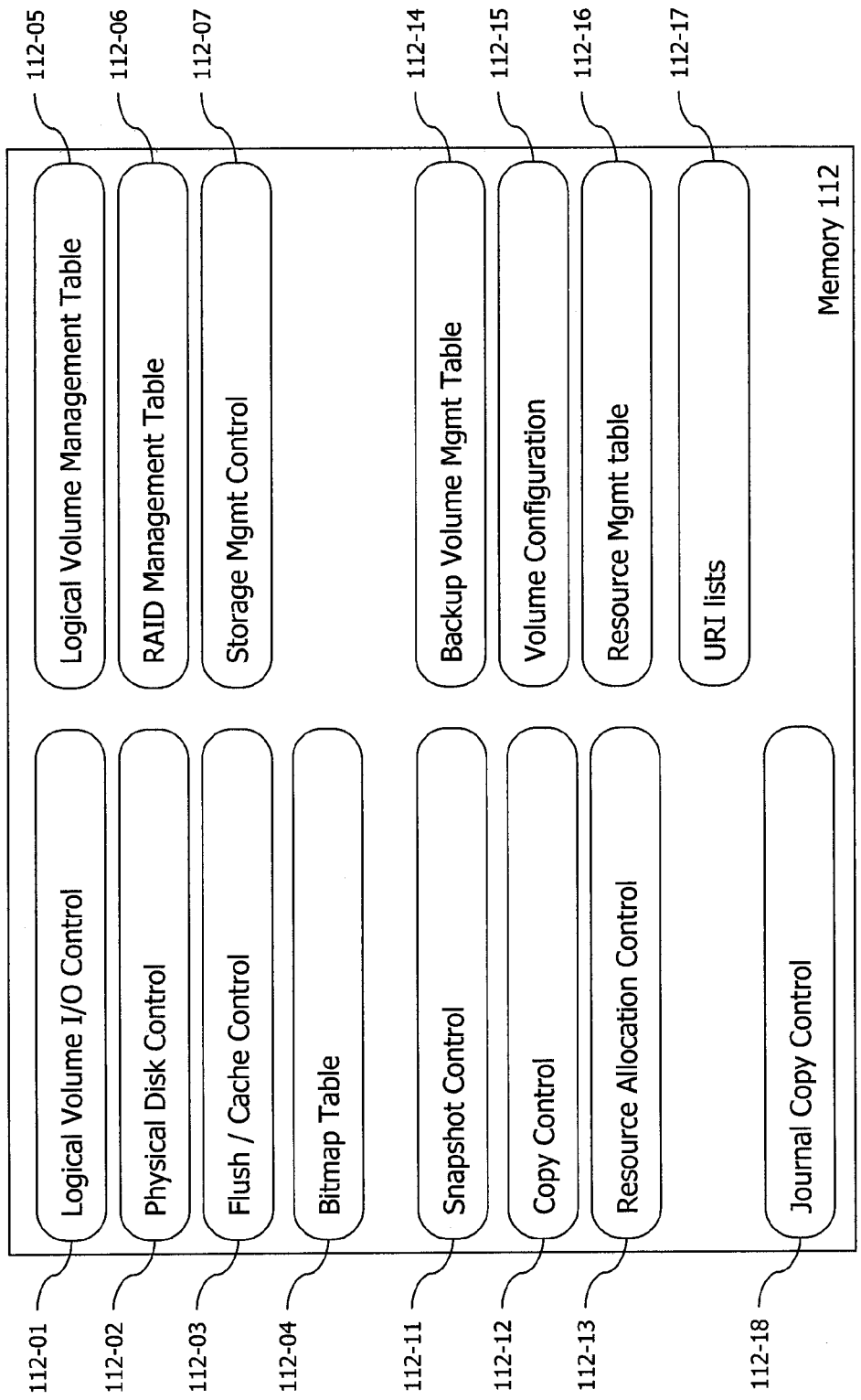
Fig.2 Software Module Configuration on Storage Controller

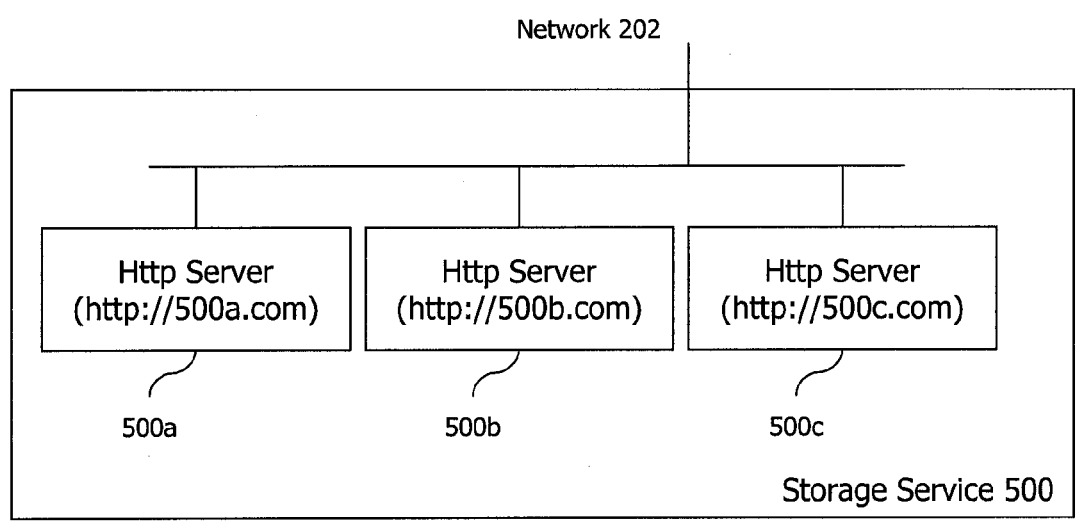
Fig.3 Configuration of Storage Service

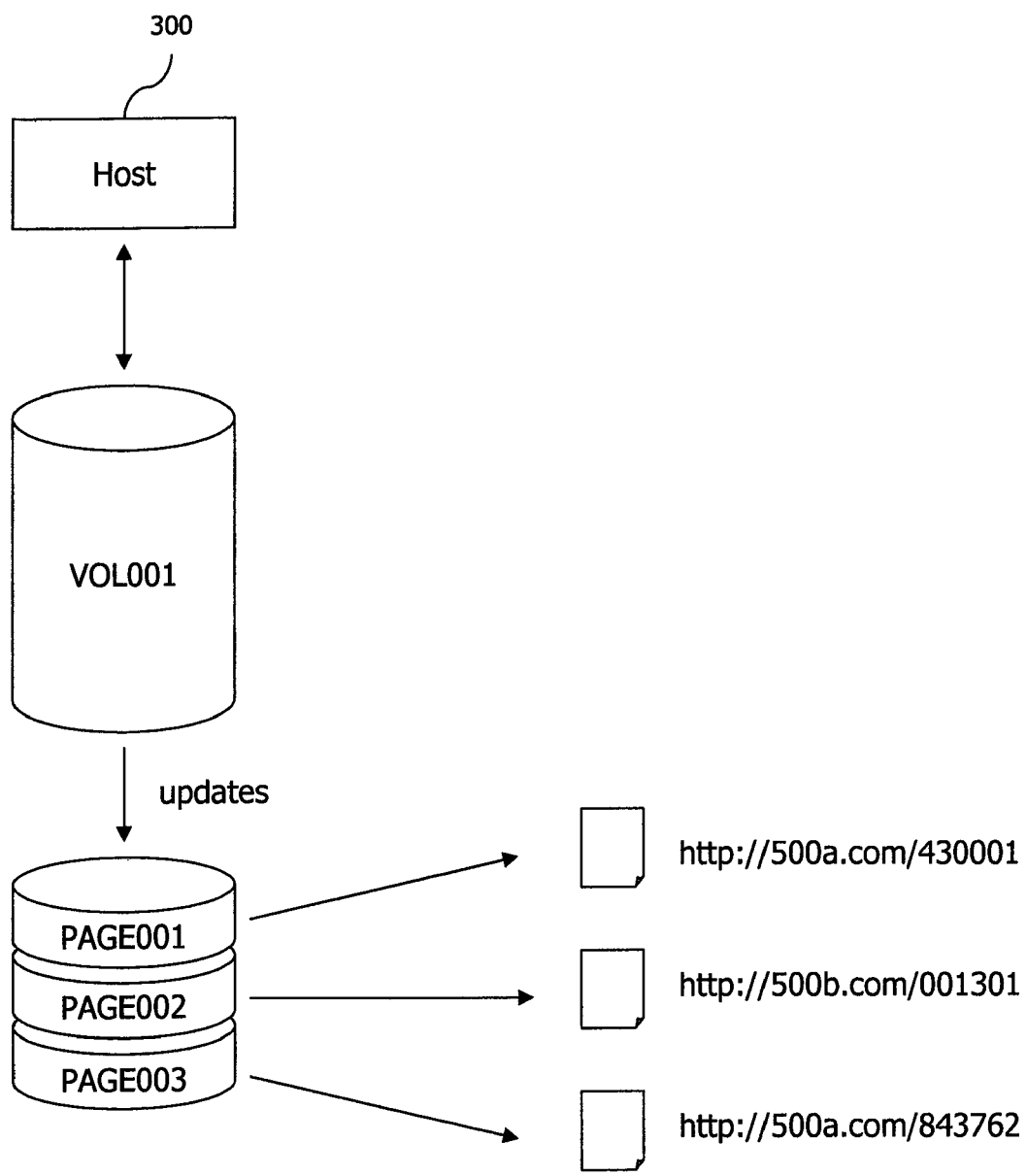
Fig.4 Example of Basic Backup Volume Mgmt

| Top LBA Addr. of Volume Page | RAID Grp. # | Top LBA Addr. of RAID Grp Page | |
|---|---|---|---|
| 0x0000 | 10 | 0x4000 | (PAGE001) |
| 0x0100 | 10 | 0x0200 | (PAGE002) |
| 0x0200 | N/A | N/A | |
| 0x0300 | 13 | 0x3400 | (PAGE003) |
| 0x0400 | N/A | N/A | |
| 0x0500 | N/A | N/A | |

Logical Volume Mgmt Table 112-05

Fig.5 Example of Logical Volume Mgmt Table of VOL001 (snapshot)

| RAID Grp. # | Top LBA Addr. of RAID Grp Page | Status |
|---|---|---|
| 10 | 0x0100 | Free |
| 10 | 0x0200 | Used |
| 10 | ... | Free |
| 10 | 0x4000 | Used |
| 10 | 0x5000 | Free |
| 11 | 0x0100 | Free |
| 11 | 0x0200 | Free |
| ... | | Free |

RAID Mgmt Table 112-06

Fig.6 Example of RAID Mgmt Table

| Top LBA Addr. of Volume Page | URI | |
|---|---|---|
| 0x0000 | http://500a.com/430001 | (PAGE001) |
| 0x0100 | http://500b.com/001301 | (PAGE002) |
| 0x0100 | http://501a.com/343429 | (Duplicated) |
| 0x0200 | N/A | |
| 0x0300 | http://500a.com/843762 | (PAGE003) |
| 0x0400 | N/A | |
| 0x0500 | N/A | |

Backup Volume Mgmt Table 112-14

Fig.7 Example of Backup Volume Mgmt Table for VOL001

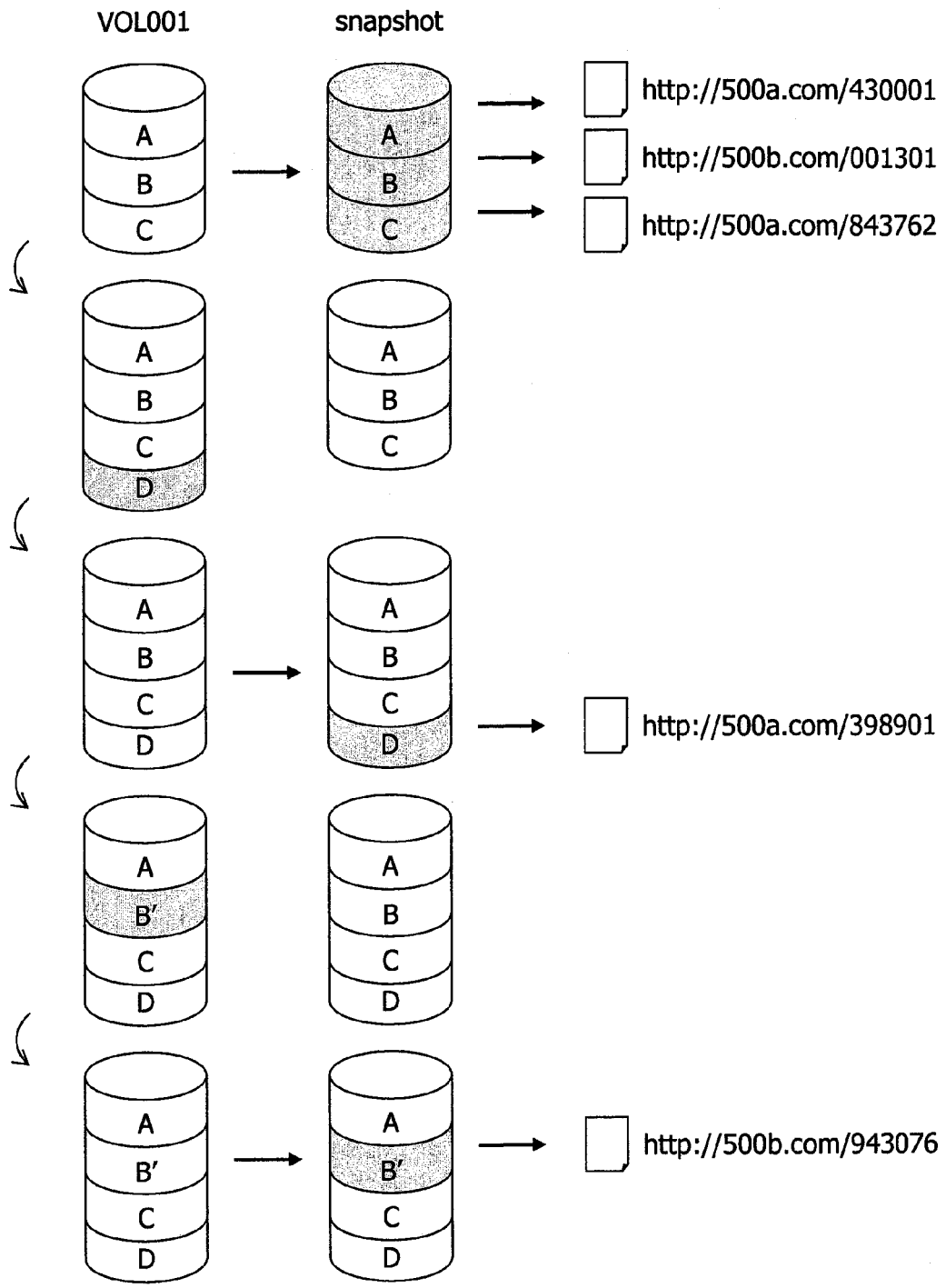
Fig.8 Example of Creating Multiple Generation Snapshot (replication)

| VOL001 replicated snapshot – 12/01 13:00 | |
|---|---|
| Top LBA Addr. of Volume Page | URI |
| 0x0000 | http://500a.com/430001 |
| 0x0100 | http://500b.com/001301 |
| 0x0200 | N/A |
| 0x0300 | http://500a.com/843762 |
| 0x0400 | N/A |
| 0x0500 | N/A |

Backup Volume Mgmt Table 112-14

Fig.9a Example of Backup Volume Mgmt Table for VOL001

| VOL001 replicated snapshot – 12/01 15:00 | |
|---|---|
| Top LBA Addr. of Volume Page | URI |
| 0x0000 | http://500a.com/430001 |
| 0x0100 | http://500b.com/001301 |
| 0x0200 | N/A |
| 0x0300 | http://500a.com/843762 |
| 0x0400 | http://500a.com/398901 |
| 0x0500 | N/A |

Backup Volume Mgmt Table 112-14

Fig.9b Example of Backup Volume Mgmt Table for VOL001

| VOL001 Initial replication – 12/01 17:00 | |
|---|---|
| Top LBA Addr. of Volume Page | URI |
| 0x0000 | http://500a.com/430001 |
| 0x0100 | http://500b.com/943076 |
| 0x0200 | N/A |
| 0x0300 | http://500a.com/843762 |
| 0x0400 | http://500a.com/398901 |
| 0x0500 | N/A |

Backup Volume Mgmt Table 112-14

Fig.9c Example of Backup Volume Mgmt Table for VOL001

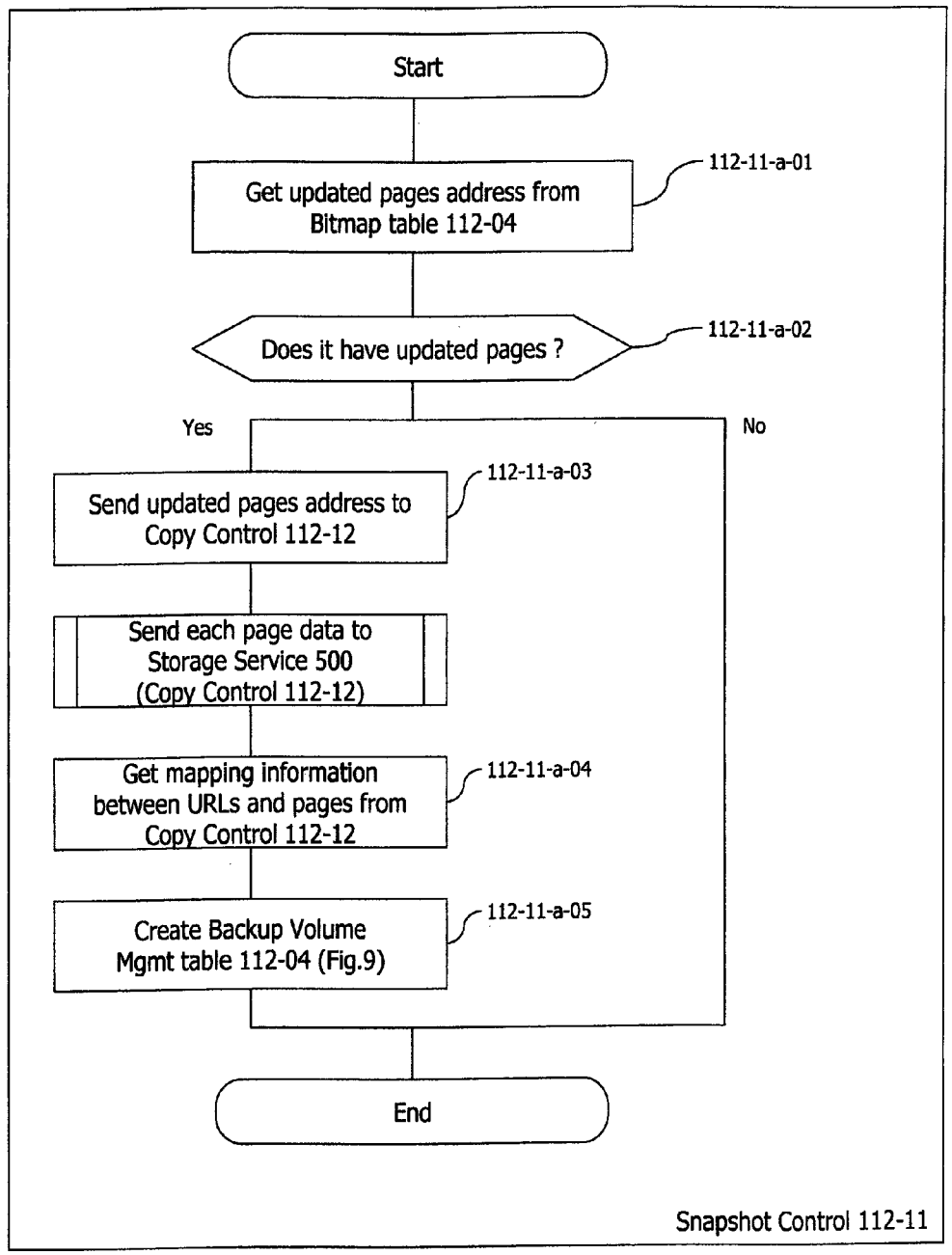
Fig.10 Flowchart of creating replicated snapshot

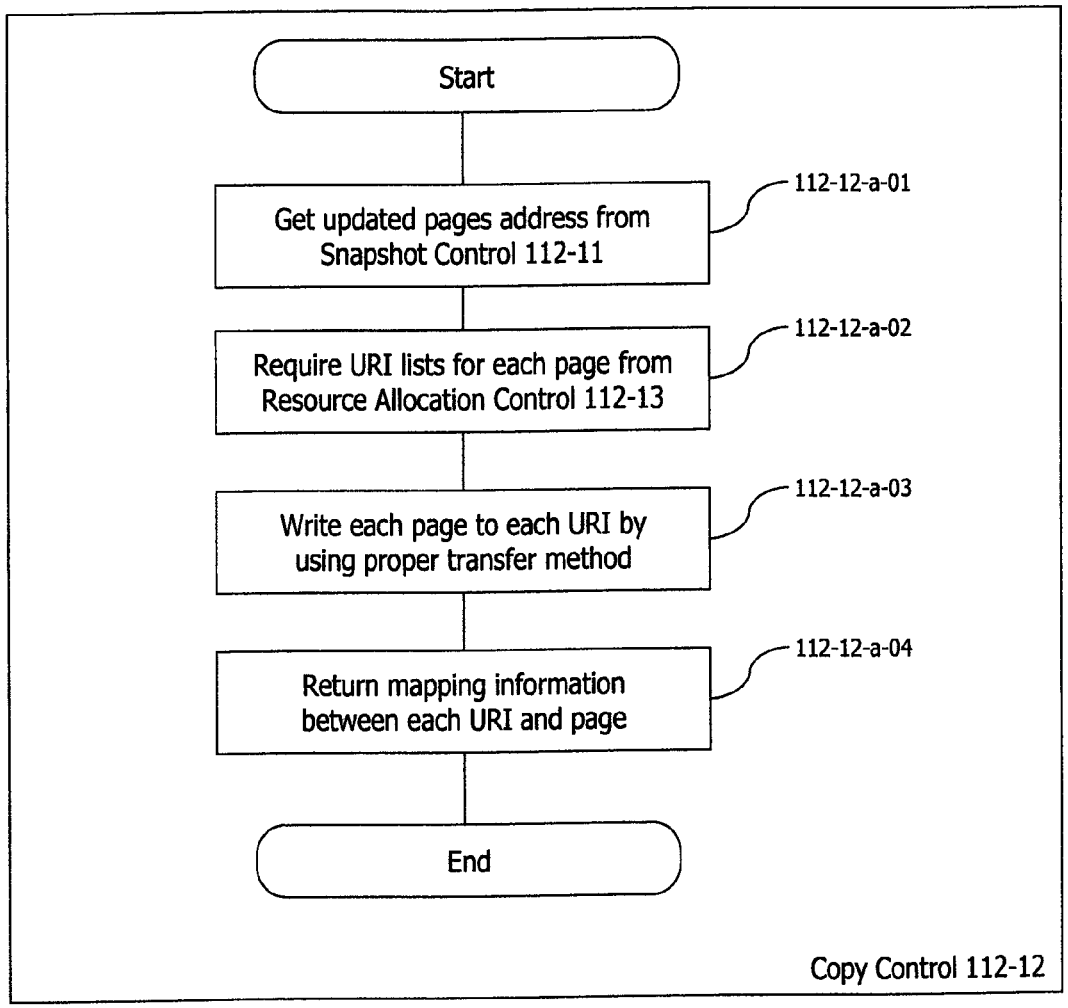
Fig.11 Flowchart of copying pages to URI storage resources

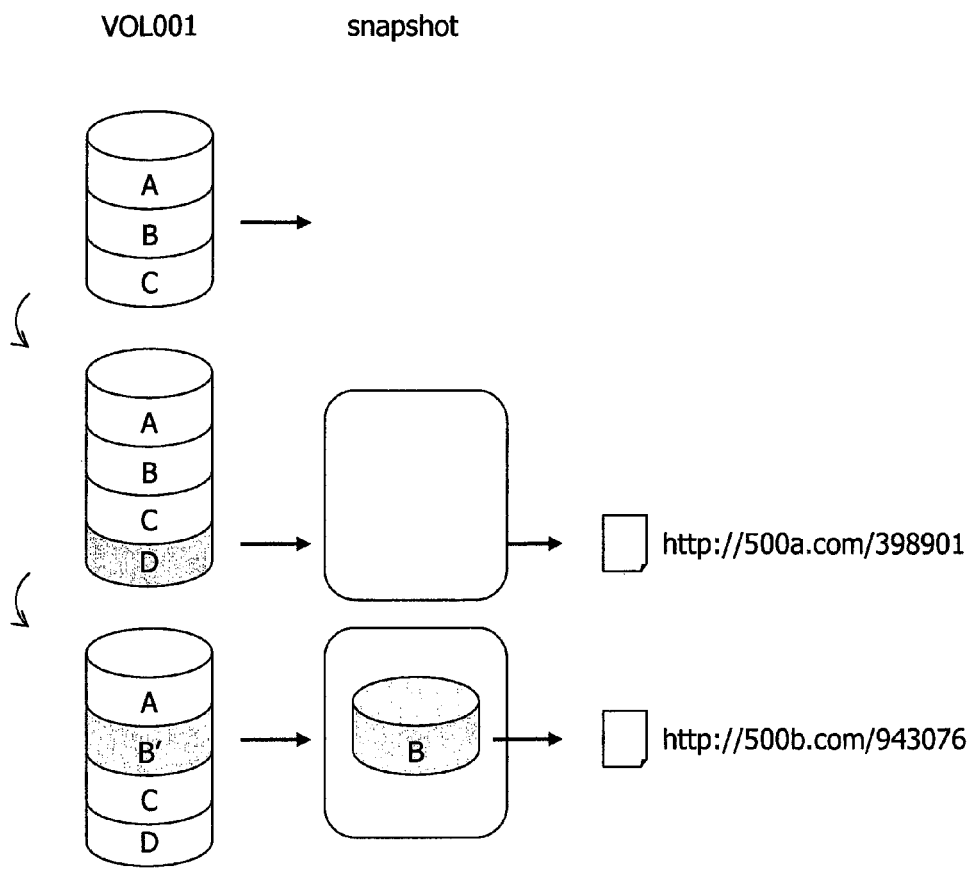
Fig.12 Example of Creating Multiple Generation Snapshot (CoW)

| VOL001 CoW snapshot – 12/01 15:00 | |
|---|---|
| Top LBA Addr. of Volume Page | URI |
| 0x0400 | http://500a.com/398901 |

Backup Volume Mgmt Table 112-14

Fig.13a Example of Backup Volume Mgmt Table for VOL001

| VOL001 CoW snapshot – 12/01 17:00 | |
|---|---|
| Top LBA Addr. of Volume Page | URI |
| 0x0100 | http://500b.com/943076 |

Backup Volume Mgmt Table 112-14

Fig.13b Example of Backup Volume Mgmt Table for VOL001

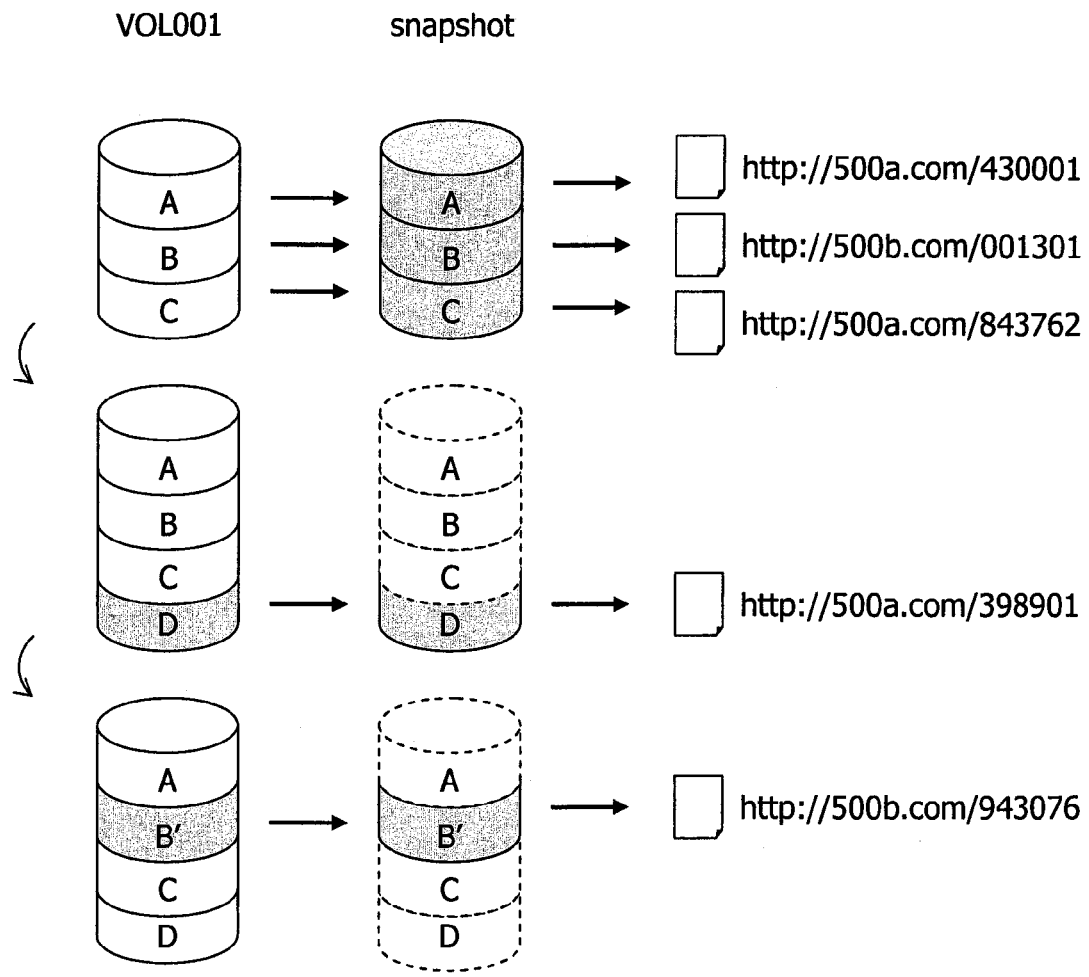
Fig.14 Example of Creating Multiple Generation Snapshot (CDP)

| VOL001 update log | | |
|---|---|---|
| Top LBA Addr. of Volume Page | URI | Time |
| 0x0000 | http://500a.com/430001 | 12/01 11:45 |
| 0x0100 | http://500b.com/001301 | 12/01 12:17 |
| 0x0300 | http://500a.com/843762 | 12/01 12:34 |
| 0x0400 | http://500a.com/398901 | 12/01 14:03 |
| 0x0100 | http://500b.com/943076 | 12/01 16:42 |

Backup Volume Mgmt Table 112-14

Fig.15 Example of Backup Volume Mgmt Table for VOL001

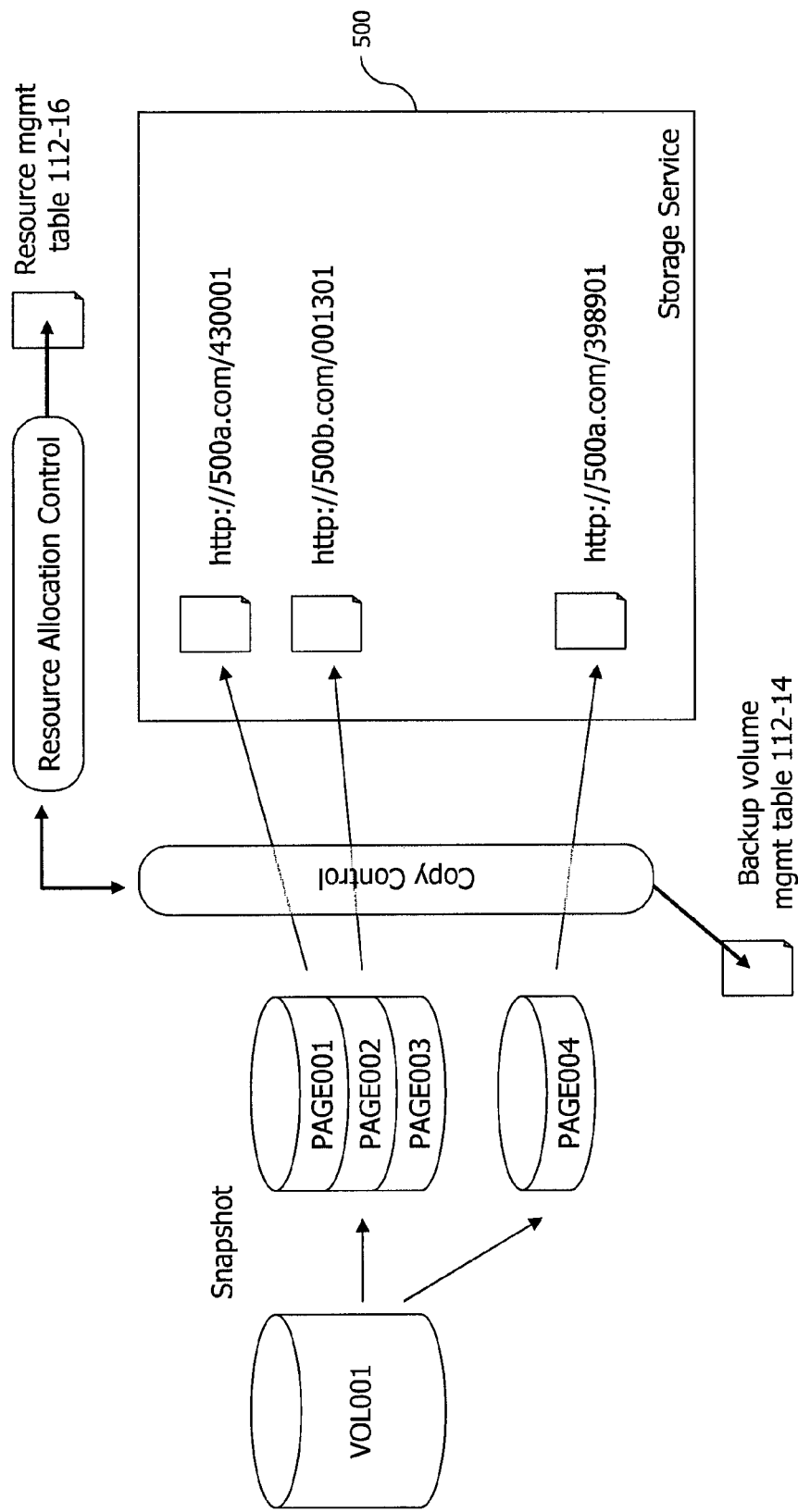
Fig.16 Example of Resource Mgmt System Structure

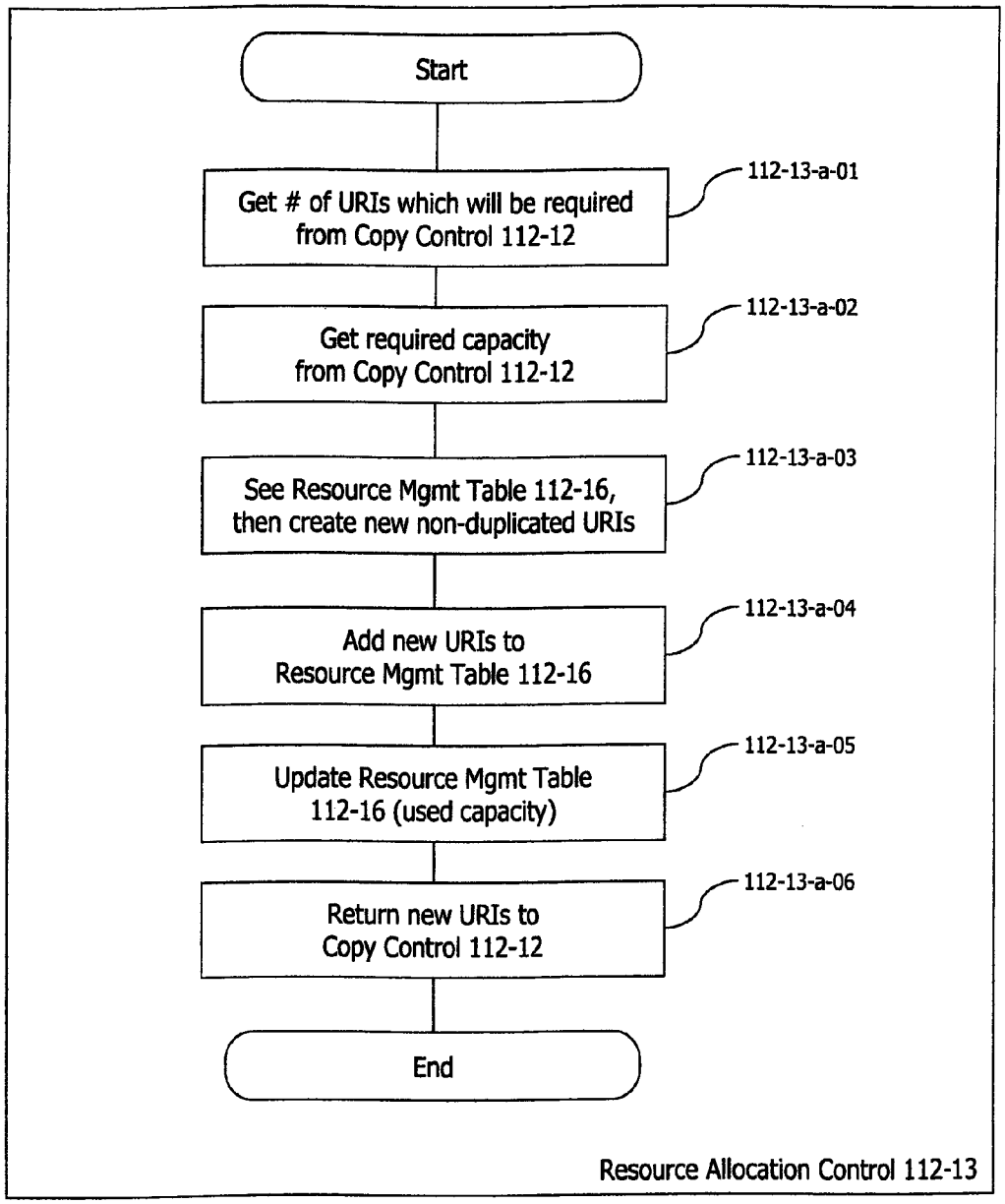
Fig.17 Flowchart of requiring new resources

| Resource | Max Capacity | Used Capacity |
|---|---|---|
| http://500a.com/ | 10TB | 2TB |
| http://500b.com/ | 8TB | 4TB |

Resource Mgmt Table 112-16

Fig.18 Example of Resource Mgmt Table

| URI | Usr ID | Passwd |
|---|---|---|
| http://500a.com/430001 | Usr_a | XXX |
| http://500b.com/001301 | Usr_a | XXX |
| http://500a.com/843762 | Usr_a | XXX |
| http://500a.com/478960 | Usr_a | XXX |
| http://500a.com/398901 | Usr_a | XXX |
| http://500b.com/943076 | Usr_a | XXX |
| ftp://500c.com/847329 | Usr_a | XXX |

URI list 112-17

Fig.19 Example of URI list

| VOL001 update log | | |
|---|---|---|
| Top LBA Addr. of Volume Page | URI | Time |
| 0x0400 | http://500a.com/398901 | 12/01 14:03 |
| 0x0100 | http://500b.com/943076 | 12/01 16:42 |

Backup Volume Mgmt Table 112-14

Fig.20 Example of Backup Volume Mgmt Table for VOL001

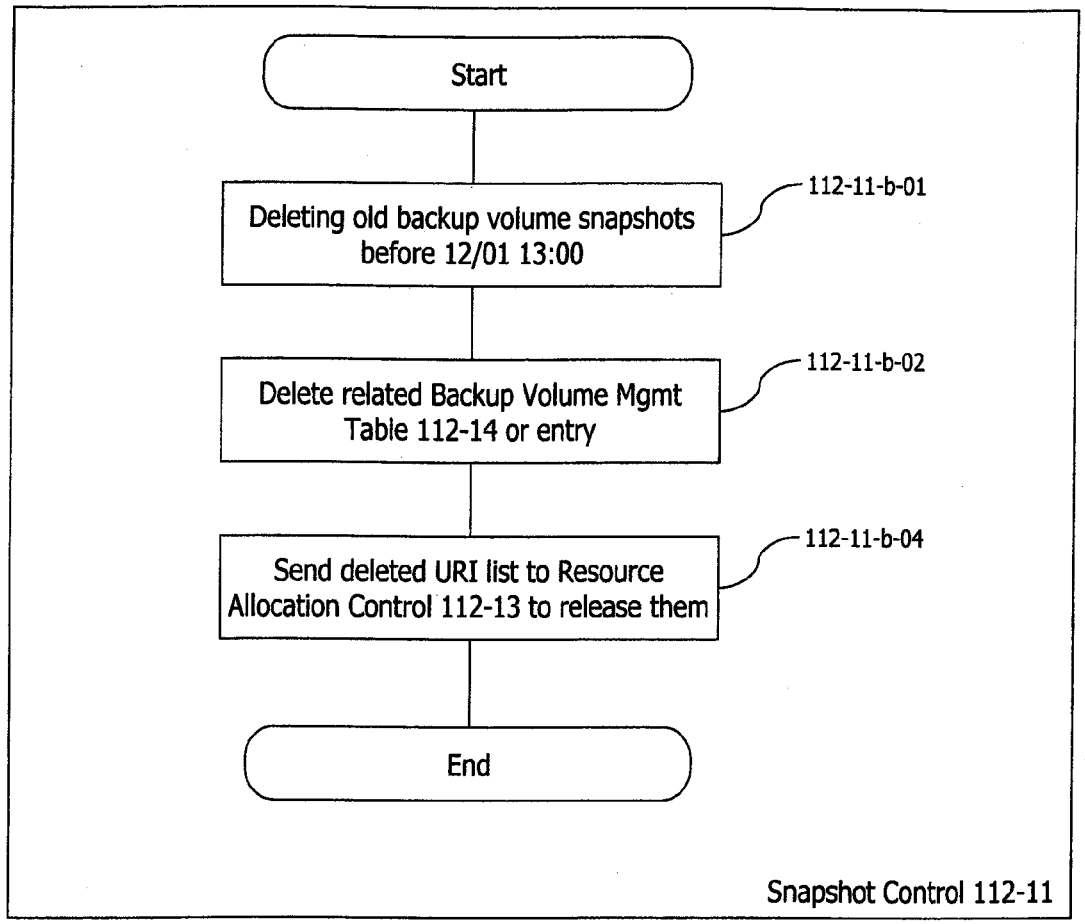
Fig.21 Flowchart of deleting snapshots

```
POST /430001 HTTP/1.1
Host: 500a.com:80
Keep-Alive: 300
Content-Type: application/x-usp-http-backup
X-Top-Of-LBA-Address: 0x0200
X-Number-Of-LBAs: 256
```

```
HTTP/1.1 200 OK
Date: Sun, 11 Jan 2004 16:06:23 GMT
Server: Apache/1.3.22 (Unix) (Red-Hat/Linux)
Last-Modified: Sun, 07 Dec 2008 12:34:56 GMT
Content-Type: application/x-usp-http-backup
X-Top-Of-LBA-Address: 0x0200
X-Number-Of-LBAs: 256
```

Fig.22 Example of http message for variable page size

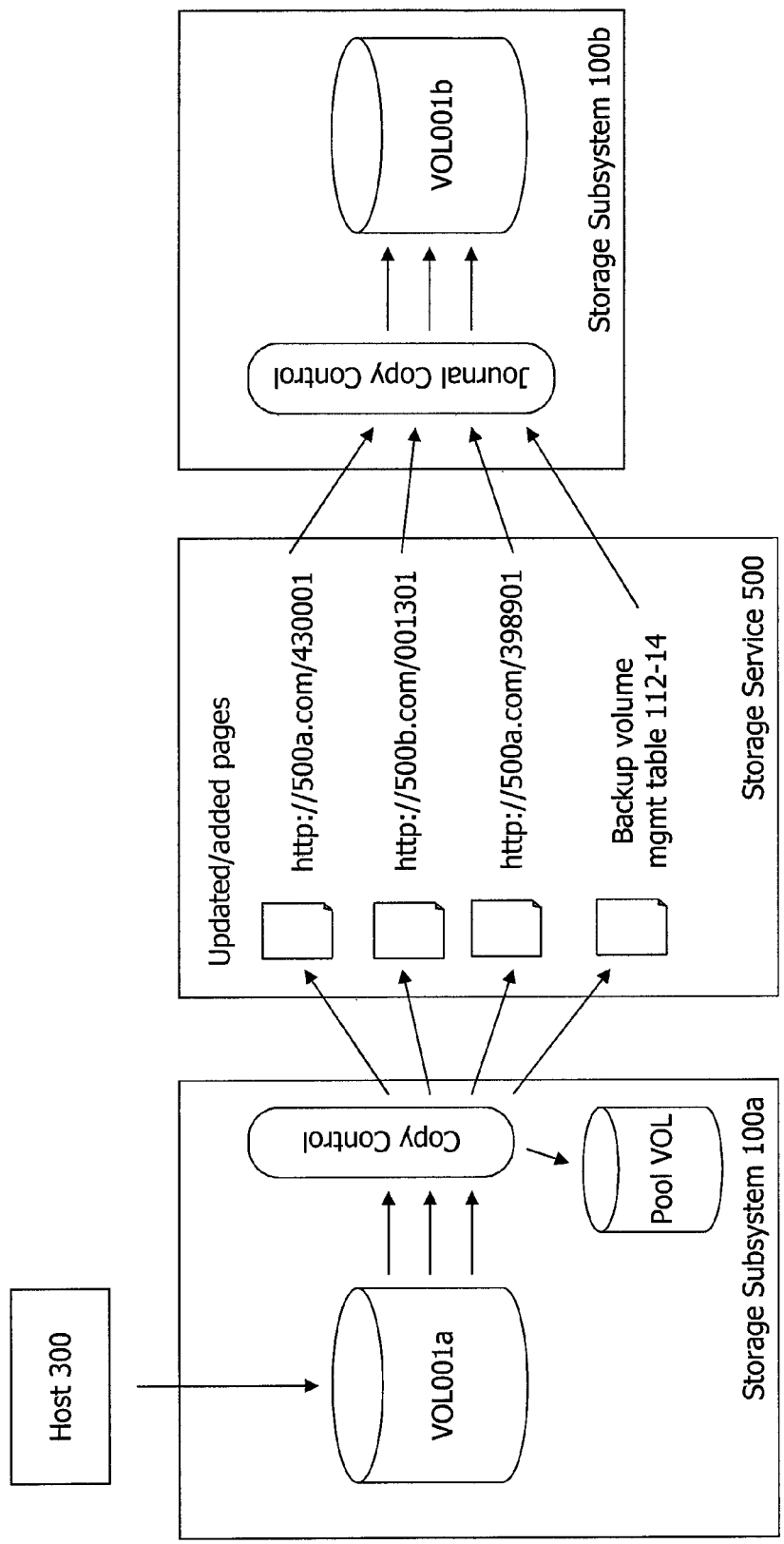
Fig.23 Example of Journal Based Copy System Configuration

METHOD AND APPARATUS FOR BLOCK BASED VOLUME BACKUP

BACKGROUND OF THE INVENTION

The present invention relates generally to backup digital data of storage subsystem and, more particularly, to block-based volume backup involving block storage subsystem such as SAN (Storage Area Network), using file storage subsystem such as NAS (Network Attached Storage), HTTP (HyperText Transfer Protocol), and the like for backup target.

Backing up data is very important to prevent data loss from device failure, disaster, operation failure, and so on. Traditionally, a storage subsystem has utilized tape device (D2T), block disk device (D2D), and a combination thereof (D2D2T) for backup target. Today, there is another backup target which is provided by cloud storage services. Generally, a cloud storage service consists of file storage service such as NAS, HTTP, and so on. It is known as D2CD (cloud) backup.

Most of the current solutions are file/file-system based cloud storage backup. For instance, a software program on the host computer reads data via a file-system such as ext3 and sends the data (as a file) to cloud storage services. The data itself is stored on local disk, DAS (Direct Attached Storage), SAN, and so on. However, several application programs such as database require block based backup method, while these solutions allows only file based backup.

Other current solutions are sending block SCSI command to the HTTP server by translating host SCSI read/write command to HTTP GET/POST command. It allows representing the HTTP server disk space as volume, LU (Logical Unit) on the storage subsystem. However it means direct command conversion and it lacks the method of creating multi-generation snapshots for backup. A backup system always requires multi-generation backup images, so that the methods of creating multi-generation snapshot must be required.

Currently, there is a volume-based backup method by utilizing a storage subsystem, but it can be carried out only with block base storage subsystems.

BRIEF SUMMARY OF THE INVENTION

Exemplary embodiments of the invention provide methods and apparatuses for block based storage subsystem to have backup ability to a file based storage service such as HTTP or cloud storage service.

An aspect of the present invention is directed to a system including a storage system coupled via a network to a storage service which has one or more file servers. The storage system comprises a processor; a memory; a volume-based snapshot control module configured to create a snapshot volume of data at a certain time, the snapshot volume being a block-based volume which is divided into a plurality of portions; and a copy control module configured to read each portion of the snapshot volume and send said each portion as file data to the storage service via the network, and to generate mapping information between an address of said each portion in the storage system and a file identifier of the file data of said each portion in the storage service.

In an embodiment for snapshot replication, the volume-based snapshot control module is configured to create a next generation snapshot volume at a next time after the certain time. The next generation snapshot volume is a block-based volume which is divided into a plurality of next portions. The plurality of next portions include one or more updated portions at the next time which are updated from corresponding one or more of the portions of the snapshot volume at the certain time. The copy control module is configured to read each updated portion of the next generation snapshot volume and send said each updated portion as file data to the storage service via the network, and to generate next mapping information between an address of said each updated portion in the storage system and a file identifier of the file data of said each updated portion in the storage service.

In an embodiment for copy-on-write (CoW) snapshot, the volume-based snapshot control module is configured to create a next generation snapshot volume at a next time after the certain time. The next generation snapshot volume is a block-based volume which is divided into a plurality of next portions. The plurality of next portions include one or more updated portions at the next time which are updated from corresponding one or more of the portions of the snapshot volume at the certain time. For each updated portion of the next generation snapshot volume, the copy control module is configured to read the corresponding portion of the snapshot volume at the certain time prior to being updated to said each updated portion and send said corresponding portion as file data to the storage service via the network, and to generate new mapping information between an address of said corresponding portion in the storage system and a file identifier of the file data of said corresponding portion in the storage service.

In an embodiment for continuous data protection (CDP) snapshot, the volume-based snapshot control module is configured to create a next generation snapshot volume at a next time after the certain time. The next generation snapshot volume being a block-based volume which is divided into a plurality of next portions. The plurality of next portions including one or more updated portions at the next time which are updated from corresponding one or more of the portions of the snapshot volume at the certain time. The copy control module is configured to read each updated portion of the next generation snapshot volume and send said each updated portion as file data to the storage service via the network, and to generate next mapping information between an address of said each updated portion in the storage system and a file identifier of the file data of said each updated portion in the storage service. The next mapping information includes a timestamp of the next time for said each updated portion.

In some embodiments, the file identifier is an HTTP URL (Uniform Resource Locator). The portions of the snapshot volume have different sizes. The volume-based snapshot control module is configured to create a next generation snapshot volume at a next time after the certain time. The next generation snapshot volume is a block-based volume which is divided into a plurality of next portions. The plurality of next portions include one or more updated portions at the next time which are updated from corresponding one or more of the portions of the snapshot volume at the certain time. The volume-based snapshot control module is configured to delete any of the portions of the snapshot volume which have been updated to the updated portions at the next time in the next generation snapshot volume. A resource allocation control module is configured, if a deleted portion of the snapshot volume has been sent to the storage service as file data with a file identifier, to delete the file data and file identifier for the deleted portion.

Another aspect of the invention is directed to a method of volume backup in a system including a storage system coupled via a network to a storage service which has one or more file servers, the storage system including a processor and a memory. The method comprises creating a snapshot volume of data in the storage system at a certain time, the snapshot volume being a block-based volume which is divided into a plurality of portions; reading each portion of the snapshot volume and sending said each portion as file data to the storage service via the network; and generating mapping information between an address of said each portion in the storage system and a file identifier of the file data of said each portion in the storage service.

Another aspect of the invention is directed to a computer readable storage medium storage a plurality of instructions for controlling a data processor to perform volume backup for a storage system coupled via a network to a storage service which has one or more file servers. The plurality of instructions comprise instructions that cause the data processor to create a snapshot volume of data in the storage system at a certain time, the snapshot volume being a block-based volume which is divided into a plurality of portions; instructions that cause the data processor to read each portion of the snapshot volume and send said each portion as file data to the storage service via the network; and instructions that cause the data processor to generate mapping information between an address of said each portion in the storage system and a file identifier of the file data of said each portion in the storage service.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of a computer system in which the method and apparatus of the invention may be applied.

FIG. 2 shows a software module configuration of the memory in the storage subsystem of FIG. 1.

FIG. 3 shows an example of the configuration of the storage service of FIG. 1.

FIG. 4 shows an example of basic backup volume management.

FIG. 5 shows an example of the logical volume management table of the snapshot of the online volume of FIG. 4.

FIG. 6 shows an example of the RAID management table.

FIG. 7 shows an example of the backup volume management table for the online volume of FIG. 4.

FIG. 8 shows an example of creating multiple generation snapshot (replication).

FIGS. 9a-9c show examples of the backup volume management table for the online volume at different replicated snapshots.

FIG. 10 shows an example of a process flow diagram for creating replicated snapshot by the snapshot control.

FIG. 11 shows an example of a process flow diagram for copying pages to URL storage resources by the copy control.

FIG. 12 shows an example of creating multiple generation snapshot CoW (Copy on Write).

FIGS. 13a-13b show examples of the backup volume management table for the online volume at different CoW snapshots.

FIG. 14 shows an example of creating multiple generation snapshot CDP (Continuous Data Protection).

FIG. 15 shows an example of the backup volume management table for the online volume with an update log generated with CDP snapshot.

FIG. 16 shows an example of a resource management system structure.

FIG. 17 shows an example of a process flow diagram of requiring new resources by the resource allocation control.

FIG. 18 shows an example of the resource management table.

FIG. 19 shows an example of the URI list.

FIG. 20 shows an example of the backup volume management table for the online volume for an update log of CDP type snapshots illustrating deletion of snapshots.

FIG. 21 shows an example of a process flow diagram for deleting snapshots by the snapshot control.

FIG. 22 shows an example of HTTP message for variable page size.

FIG. 23 shows an example of journal-based copy system configuration.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for block based storage subsystem to have backup ability to a file based storage service such as HTTP or cloud storage service.

Data backup solution is very important to prevent data lost. Currently, utilizing cloud storage service such as HTTP storage service is becoming increasingly popular. The conventional solution is file/file-system based backup. It allows updated and newly added file backup to the cloud storage service. However, some applications such as database require block volume, where the conventional cloud storage backup solution does not work. According to embodiments of this invention, the storage subsystem creates a snapshot volume by utilizing a snapshot function. A copy function reads the portion of the snapshot volume such as one or more LBAs and sends each portion as file data to the file storage such as the HTTP server. It then creates a mapping table between the address of the portion and the file identifier such as the HTTP URL for use as backup volume management information. In this way, an administrator can create multiple generation backup block volume images to be stored in the cloud storage service.

1. Basic Backup Volume Management Method

FIG. 1 illustrates an example of a hardware configuration of a computer system in which the method and apparatus of the invention may be applied. It includes a storage subsystem 100, networks 201 and 202 such as SAN, a host computer 300, a management server 400, and a storage service 500. The storage subsystem 100 has a storage controller 110 and a disk unit 120. The storage controller includes a CPU 111, a memory 112, a SAN I/F 113 for interface with the host 300 via the network 201, a disk I/F 114 for interface with the disk unit 120, and an Ether I/F 115 for interface with the management server 400 and the storage service 500 via the network 202. The storage controller 110 performs disk I/O functionality with the host computer 300 using Fibre Channel Protocol via the SAN 201 through the SAN I/F 113. The disk unit 120 has plural Hard Disk Drives (HDDs) and the storage controller 110 combines these HDDs and configures RAID (Redundant Arrays of Inexpensive Disks), and then provides volume (LU: Logical Unit) to the host computer 300. These functions are executed by application programs shown in FIG. 2 (including logical volume I/O control, physical disk control, and the like).

FIG. 2 shows a software module configuration of the memory 112 in the storage subsystem 100. It includes logical volume I/O control 112-01, physical disk control 112-02, flush/cache control 112-03, bitmap table 112-04, logical volume management table 112-05, RAID management table 112-06, storage management control 112-07, snapshot control 112-11, copy control 112-12, resource allocation control 112-13, backup volume management table 112-14, volume configuration 112-15, resource management table 112-16, URI lists 112-17, and journal copy control 112-18.

FIG. 3 shows an example of the configuration of the storage service 500. It includes one or more HTTP server 500a, 500b, 500c. This example represents the case where each HTTP server has its own host name.

FIG. 4 shows an example of basic backup volume management. In this conceptual figure of the backup volume management scheme, the volume VOL001 is an online volume for the host 300. The host 300 sends read & write I/O (SCSI command) to the volume VOL001. By using conventional snapshot technology, the snapshot control 112-11 on the storage subsystem 100 creates a snapshot of the online volume VOL001. After that, the copy control 112-12 on the storage subsystem 100 sends the snapshot volume 001 data to the storage service 500 by dividing the data of the snapshot volume 001 into several portions of data.

The online volume 001 consists of multiple LBAs (Logical Block Addresses). FIG. 5 shows an example of a logical volume management table 112-05 of the snapshot volume 001 of FIG. 4. The logical volume management table 112-05 includes columns of top LBA of volume page, RAID group number, and top LBA of RAID group page. FIG. 6 shows an example of the RAID management table 112-06. The RAID management table 112-06 includes columns of RAID group number, top LBA of RAID group page, and status (used or free). The data (LBA) of the volume comes from the RAID group managed by the RAID management table 112-06 according to the conventional RAID (Redundant Array of Independent Disks) method. In FIG. 5 under the top LBA of volume page column, the LBA of 0x0000 to 0x0100 means this portion of data comprises 256 LBA (Hex). In this example, it is referred to as a page. For instance, LBA 0x0000 to 0x0100 is referred to as PAGE001.

After creating the snapshot volume 001, the copy control 112-12 on the storage subsystem 100 reads each page of the snapshot volume 001, and sends each page to the storage service 500 as an HTTP request. For instance, PAGE001 is sent as http://500a.com/430001, as seen in FIG. 4. Each page (or each LBA) is represented as an URL on the storage service 500, and the copy control 112-12 on the storage subsystem 100 will execute this process.

FIG. 7 shows an example of the backup volume management table 112-14 for the online volume VOL001 of FIG. 4. The table 112-14 includes top LBA of volume page column and URI column. This backup volume is located in the storage service 500. As seen in FIG. 7, each page (LBA) is represented as an URL on the storage service 500. Note that the LBA 0x0100 has two URL for data duplication. URI stands for Uniform Resource Identifier, and it indicates the address of a resource on the Internet such as an URL (Uniform Resource Locator) of WWW HTTP address (e.g., http://xxx/yyy), FTP address (e.g., ftp://xxx/yyy), and so on. In this description, file address information such as \\NASHOST\DIR1\FILE1, /usr/home/aaa on the file system can be used instead of URI or a mixture of URI.

In this embodiment, FIG. 5 shows the example of a fixed page size for the logical volume management table 112-05. It has 256 LBA and the page size can be calculated based on the LBA. If a variable page size is required, the copy control 112-12 will embed the page size information such as the number of LBA into an HTTP header as illustrated in FIG. 22. FIG. 22 shows an example of HTTP message for variable page size.

2. Snapshot (Replication)

FIG. 8 shows an example of creating multiple generation snapshot (replication). In this conceptual figure of creating multiple generation replicated snapshot volume, the snapshot of the online volume 001 is a replicated snapshot.

At first, the snapshot control 112-11 creates a replicated snapshot of the online volume 001 at 12/01 13:00, for instance. The volume 001 can be updated by the host 300 because it is an online volume, but the snapshot volume 001 will not be updated anymore. The copy control 112-12 reads each page of the snapshot volume 001 and sends each page to the storage service 500 as HTTP file data. FIG. 9a shows an example of the backup volume management table 112-14 for the volume VOL001 at the 12/01 13:00 snapshot.

Next, the snapshot control 112-11 creates a replicated snapshot of the online volume 001 at 12/01 15:00, for instance. It will be the second generation snapshot image of the online volume 001. The copy control 112-12 reads each page of the snapshot volume 001 and sends each page to the storage service 500 as HTTP file data, in the same way as in the previous step. This time, the "D" area is updated (added), so that only the related page of this updated data will be transferred. FIG. 9b shows an example of the backup volume management table 112-14 for the volume VOL001 at the 12/01 15:00 snapshot. The next replicated snapshot is taken at 12/01 17:00.

FIG. 9c shows an example of the backup volume management table 112-14 for the volume VOL001 at the 12/01 17:00 snapshot. This time, the "B" area is updated and it brings the copy control 112-12 to read and send only this portion.

FIG. 10 shows an example of a process flow diagram for creating replicated snapshot by the snapshot control 112-11. In step 112-11-a-01, the program gets the updated pages address from the bitmap table 112-04. If there are no updated pages in step 112-11-a-02, the process ends. Otherwise, the program sends the updated pages address to the copy control 112-12 in step 112-11-a-03. The copy control 112-12 sends each page data to the storage service 500. In step 112-11-a-04, the program gets mapping information between the URLs and the pages from the copy control 112-12. In step 112-11-a-05, the program creates the backup volume management table 112-04 (see examples in FIG. 9).

FIG. 11 shows an example of a process flow diagram for copying pages to URL storage resources by the copy control 112-12. In step 112-12-a-01, the program gets the updated pages address from the snapshot control 112-11 (see FIG. 10). In step 112-12-a-02, the program requires the URI lists 112-17 for each page from the resource allocation control 112-13. In step 112-12-a-03, the program writes each page to each URI by using the proper transfer method. In step 112-12-a-04, the program returns mapping information between each URI and the page.

3. Snapshot (CoW)

FIG. 12 shows an example of creating multiple generation snapshot CoW (Copy on Write). In this conceptual figure for creating multiple generation CoW snapshot volume, the snapshot of the online volume VOL001 is a CoW snapshot.

At first, the snapshot control 112-11 creates a CoW snapshot of the online volume 001 at 12/01 13:00, for instance. The CoW snapshot volume does not have actual data. It only has pointer information of the actual volume 001. The volume 001 can be updated by the host 300 because it is an online volume, and when data is updated or added, actual old data will be copied to the CoW snapshot volume, as illustrated for data areas "D" and "B".

When creating the backup volume, the copy control 112-12 reads each page of the CoW snapshot volume 001 and sends each page to the storage service 500 as HTTP file data. FIG. 13a shows an example of the backup volume management table 112-14 for the volume VOL001 at the 12/01 15:00 CoW snapshot for area "D." FIG. 13b shows an example of the backup volume management table 112-14 for the volume VOL001 at the 12/01 17:00 CoW snapshot for area "B."

4. Snapshot (CDP)

FIG. 14 shows an example of creating multiple generation snapshot creating multiple generation snapshot CDP (Continuous Data Protection). In this conceptual figure for creating multiple generation CDP snapshot volume, the snapshot of the online volume VOL001 is a CDP snapshot.

At first, the snapshot control 112-11 creates a CDP snapshot of the online volume 001 at 12/01 13:00, for instance. The volume 001 can be updated by the host 300 because it is an online volume, and when data is updated or added, updated or added data will be copied to the CDP snapshot volume with timestamp, as illustrated for data areas "D" and "B'."

When creating the backup volume, the copy control 112-12 reads each page of the snapshot volume 001 and sends each page to the storage service 500 as HTTP file data. FIG. 15 shows an example of the backup volume management table for the volume VOL001 with an update log generated with CDP snapshot.

5. Resource Management Method

FIG. 16 shows an example of a resource management system structure. As seen in this conceptual figure, the resource management system allows the copy control 112-12 to take URL resources to send updated/added data to the storage service 500 as HTTP file data. When the system finds the updated/added data, it directs the resource allocation control 112-13 to get the URL resources. The resource allocation control 112-13 looks up which HTTP server (host) has how many resources by checking the resource management table 112-16 (see FIG. 18), and it reserves a URL name for sending the updated/added data. The copy control 112-12 further creates the backup information and stores it in the backup volume management table 112-14.

FIG. 17 shows an example of a process flow diagram of requiring new resources by the resource allocation control 112-13. In order to manage URL names, the resource allocation control 112-13 uses the resource management table 112-16 (FIG. 18) and the URI list 112-17 (FIG. 19) to prevent duplicated URL usage. FIG. 18 shows an example of the resource management table 112-16. FIG. 19 shows an example of the URI list 112-17.

As seen in FIG. 17, the resource allocation control 112-13 gets the number of URIs which will be required from the copy control 112-12 in step 112-13-a-01, and get the required capacity from the copy control 112-12 in step 112-13-a-02. In step 112-13-a-03, the program sees the resource management table 112-16, and then creates new non-duplicated URIs. The program adds new URIs to the resource management table 112-16 in step 112-13-*a*-04, updates the resource management table 112-16 (used capacity) in step 112-13-*a*-05, and returns new URIs to the copy control 112-12 in step 112-13-*a*-06.

FIG. 20 shows an example of the backup volume management table 112-14 for the online volume of FIG. 4 for an update log of CDP type snapshots illustrating the deletion of snapshots. Creating many generation snapshots will consume resources such as the memory 112 on the storage subsystem 100 in order to preserve several backup volume management tables 112-14, which leads the administrator to delete unnecessary old generation of snapshots. For instance, the administrator has three generation replicated snapshots such as FIGS. 9*a*, 9*b*, and 9*c*. If the administrator does not need the first and second generations, the administrator can delete these tables. In another example, if the administer does not need the first generation of the CoW snapshot, FIG. 13*a* can be deleted. Also, the updated log of the CDP type snapshot can be deleted as seen in FIG. 20. In these cases, the resource of URL http://500b.com/001301 will not be required any more, for instance.

FIG. 21 shows an example of a process flow diagram for deleting snapshots by the snapshot control 112-11. In step 112-11-*b*-01, the program deletes old backup volume snapshots before 12/01 13:00. In step 112-11-*b*-02, the program deletes related backup volume management table 112-14 or entry. In step 112-11-*b*-04, the program sends the deleted URI list to the resource allocation control 112-13 to release them.

6. Using URL Backup Method as Journal Copy Pool

Block based remote copy system (which is asynchronous) requires a temporary pool as a data buffering area. In order to respond to the write I/O from the host computer quickly, when a first or local storage subsystem receives the write I/O from the host computer, it stores its data into a local temporary pool instead of sending the data to the second or remote storage subsystem. More volume to be remote copied needs more temporary pool capacity in the first storage subsystem. To get more temporary pool capacity, utilizing URL backup methods allows first storage subsystem to utilize cloud storage service resources as temporary pool capacity extension.

FIG. 23 shows an example of journal-based copy system configuration. In this conceptual figure, the system uses HTTP/cloud storage service 500 as the remote copy pool area. When the host 300 sends write I/O (updated/added data) to the volume 001*a* in the first or local storage subsystem 100*a*, the copy control 112-12 copies the updated/added data into a Pool VOL (this volume is made as normal LU, for instance). After that, the first storage subsystem 100*a* responds to the write I/O from the host 300. The journal copy control 112-18 on the second or remote storage subsystem 100*b* will read the Pool VOL of the first storage subsystem 100*a* in an asynchronous manner, and then it deletes the related data on the Pool VOL after writing its data to the volume 001*b* in the second storage subsystem 100*b*. This is the same method as that for a conventional remote copy system.

In this embodiment, the copy control 112-12 uses the storage service 500 as an extension of the Pool VOL on the first storage subsystem 100*a*. When the copy control 112-12 in the first storage subsystem 100*a* detects new data on the Pool VOL, it sends the data to the storage service 500 as HTTP file data. The journal copy control 112-18 in the second storage subsystem 100*b* reads data from the storage service 500 instead of the Pool VOL of storage subsystem 100*a*. The backup management table 112-14 on the first storage subsystem 100*a* (or storage service 500) tells the journal copy control 112-18 about the proper URLs to read.

7. Restoring Data

The following describes procedures for restoring data from the backup volume on the storage service 500.

To restore data from the replicated backup volume management table 112-14 as shown in FIGS. 9*a*, 9*b*, and 9*c* and described above, the copy control 112-12 only reads the desired generation backup volume management table 112-14 (e.g., the second generation will be FIG. 9*b*). The program gets the required data by referring to the URL of its management table, and then copies the data into volume 001.

To restore data from the CoW backup volume management table 112-14 as shown in FIGS. 13*a* and 13*b* and described above, the copy control 112-12 needs to read all generation backup volume management table 112-14 (e.g., it reads both FIGS. 13*a* and 13*b* tables). The program gets the required data by referring to the URL of its management table, and then copies the data into volume 001. At that time, it reads one or more tables from the oldest generation to the newest generation. If it finds duplicated page (LBA) area among multiple generation tables, it only gets the newest data to recover data.

To restore data from the CDP backup volume management table 112-14 shown in FIG. 15 and described above, the copy control 112-12 reads the backup volume management table 112-14. The program gets the required data by referring to the URL of its management table, and then copies the data into volume 001. At that time, it reads rows of this table from the oldest one to the newest one. If it finds duplicated page (LBA) area among these rows, it only gets the newest data to recover data.

Of course, the system configurations illustrated in FIGS. 1-3 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for block based storage subsystem to have backup ability to cloud storage service. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a system including a storage system coupled via a network to a storage service which has one or more HTTP (Hypertext Transfer Protocol) file servers, the storage system comprising:
 a processor;
 a memory;
 a volume-based snapshot control module configured to create a snapshot volume of data at a certain time, the snapshot volume being a block-based volume which is divided into a plurality of portions; and
 a copy control module configured to read each portion of the snapshot volume and send said each portion as HTTP file data of an HTTP request to the storage service via the network, and to generate mapping information between an address of said each portion in the storage system and an HTTP URL (Uniform Resource Locator) of the HTTP file data of said each portion in the storage service, so as to allow said each portion of the snapshot volume to be read by the HTTP request using said mapping information;
 wherein the volume-based snapshot control module is configured to create a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
 wherein, for each updated portion of the next generation snapshot volume, the copy control module is configured to read the corresponding portion of the snapshot volume at the certain time prior to being updated to said each updated portion and send said corresponding portion as HTTP file data to the storage service via the network, and to generate new mapping information between an address of said corresponding portion in the storage system and an HTTP URL of the HTTP file data of said corresponding portion in the storage service;
 wherein the volume-based snapshot control module is configured to create a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
 wherein the volume-based snapshot control module is configured to delete any of the portions of the snapshot volume which have been updated to the updated portions at the next time in the next generation snapshot volume; and
 wherein the storage system further comprises a resource allocation control module configured to delete the HTTP file data and HTTP URL for the deleted portion when a deleted portion of the snapshot volume has been sent to the storage service as HTTP file data with an HTTP URL.

2. The storage system according to claim 1,
 wherein the volume-based snapshot control module is configured to create a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time; and
 wherein the copy control module is configured to read each updated portion of the next generation snapshot volume and send said each updated portion as HTTP file data to the storage service via the network, and to generate next mapping information between an address of said each updated portion in the storage system and an HTTP URL of the HTTP file data of said each updated portion in the storage service.

3. The storage system according to claim 1,
 wherein the volume-based snapshot control module is configured to create a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time; and
 wherein the copy control module is configured to read each updated portion of the next generation snapshot volume and send said each updated portion as HTTP file data to the storage service via the network, and to generate next mapping information between an address of said each updated portion in the storage system and an HTTP URL of the HTTP file data of said each updated portion in the storage service, the next mapping information including a timestamp of the next time for said each updated portion.

4. The storage system according to claim 1,
 wherein the portions of the snapshot volume have different sizes.

5. The storage system according to claim 1,
 wherein, in response to the HTTP request, the copy control module sends to the storage service via the network all the portions of the snapshot volume, to be read by the HTTP request using the mapping information.

6. In a system including a storage system coupled via a network to a storage service which has one or more HTTP (Hypertext Transfer Protocol) file servers, the storage system including a processor and a memory, a method of volume backup comprising:
creating a snapshot volume of data in the storage system at a certain time, the snapshot volume being a block-based volume;
dividing said block-based snapshot volume into a plurality of portions;
reading each portion of the snapshot volume and sending said each portion as HTTP file data of an HTTP request to the storage service via the network;
generating mapping information between an address of said each portion in the storage system and an HTTP URL (Uniform Resource Locator) of the HTTP file data of said each portion in the storage service, so as to allow said each portion of the snapshot volume to be read by the HTTP request using said mapping information;
creating a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
for each updated portion of the next generation snapshot volume, reading the corresponding portion of the snapshot volume at the certain time prior to being updated to said each updated portion and sending said corresponding portion as HTTP file data to the storage service via the network, and generating new mapping information between an address of said corresponding portion in the storage system and an HTTP URL of the HTTP file data of said corresponding portion in the storage service;
creating a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
deleting any of the portions of the snapshot volume which have been updated to the updated portions at the next time in the next generation snapshot volume; and
deleting the HTTP file data and HTTP URL for the deleted portion when a deleted portion of the snapshot volume has been sent to the storage service as HTTP file data with an HTTP URL.

7. The method according to claim 6, further comprising:
creating a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
reading each updated portion of the next generation snapshot volume and sending said each updated portion as HTTP file data to the storage service via the network; and
generating next mapping information between an address of said each updated portion in the storage system and an HTTP URL of the HTTP file data of said each updated portion in the storage service.

8. The method according to claim 6, further comprising:
creating a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
reading each updated portion of the next generation snapshot volume and sending said each updated portion as HTTP file data to the storage service via the network; and
generating next mapping information between an address of said each updated portion in the storage system and an HTTP URL of the HTTP file data of said each updated portion in the storage service, the next mapping information including a timestamp of the next time for said each updated portion.

9. The method according to claim 6, wherein the portions of the snapshot volume have different sizes.

10. The method according to claim 6, further comprising:
reading, by the HTTP request using the mapping information, all the portions of the snapshot volume sent to the storage service via the network.

11. A non-transitory computer readable storage medium storing a plurality of instructions for controlling a data processor to perform volume backup for a storage system coupled via a network to a storage service which has one or more HTTP (Hypertext Transfer Protocol) file servers, the plurality of instructions comprising:
instructions that cause the data processor to create a snapshot volume of data in the storage system at a certain time, the snapshot volume being a block-based volume which is divided into a plurality of portions;
instructions that cause the data processor to read each portion of the snapshot volume and send said each portion as HTTP file data of an HTTP request to the storage service via the network;
instructions that cause the data processor to generate mapping information between an address of said each portion in the storage system and an HTTP URL (Uniform Resource Locator) of the HTTP file data of said each portion in the storage service, so as to allow said each portion of the snapshot volume to be read by the HTTP request using said mapping information;
instructions that cause the data processor to create a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;
instructions that cause the data processor, for each updated portion of the next generation snapshot volume, to read the corresponding portion of the snapshot volume at the certain time prior to being updated to said each updated portion and send said corresponding portion as HTTP file data to the storage service via the network, and generate new mapping information between an address of said corresponding portion in the storage system and an HTTP URL of the HTTP file data of said corresponding portion in the storage service;

instructions that cause the data processor to create a next generation snapshot volume at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;

instructions that cause the data processor to delete any of the portions of the snapshot volume which have been updated to the updated portions at the next time in the next generation snapshot volume; and instructions that cause the data processor to delete the file data and HTTP URL for the deleted portion when a deleted portion of the snapshot volume has been sent to the storage service as HTTP file data with an HTTP URL.

12. The non-transitory computer readable storage medium according to claim 11, wherein the plurality of instructions further comprise:

instructions that cause the data processor to create a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;

instructions that cause the data processor to read each updated portion of the next generation snapshot volume and send said each updated portion as HTTP file data to the storage service via the network; and instructions that cause the data processor to generate next mapping information between an address of said each updated portion in the storage system and an HTTP URL of the HTTP file data of said each updated portion in the storage service.

13. The non-transitory computer readable storage medium according to claim 11, wherein the plurality of instructions further comprise:

instructions that cause the data processor to create a next generation snapshot volume in the storage system at a next time after the certain time, the next generation snapshot volume being a block-based volume which is divided into a plurality of next portions, the plurality of next portions including one or more updated portions at the next time which are updated from corresponding one or more of the portions of the snapshot volume at the certain time;

instructions that cause the data process or to read each updated portion of the next generation snapshot volume and send said each updated portion as HTTP file data to the storage service via the network; and instructions that cause the data processor to generate next mapping information between an address of said each updated portion in the storage system and an HTTP URL of the HTTP file data of said each updated portion in the storage service, the next mapping information including a timestamp of the next time for said each updated portion.

14. The non-transitory computer readable storage medium according to claim 11, wherein the portions of the snapshot volume have different sizes.

15. The non-transitory computer readable storage medium according to claim 11, wherein the plurality of instructions further comprise:

instructions that cause the data processor, in response to the HTTP request, to send to the storage service via the network all the portions of the snapshot volume, to be read by the HTTP request using the mapping information.

* * * * *